US008427278B2

(12) United States Patent
Petricoin, Jr.

(10) Patent No.: US 8,427,278 B2
(45) Date of Patent: Apr. 23, 2013

(54) AUTOMATION AND SECURITY SYSTEM

(75) Inventor: Dennis M. Petricoin, Jr., Hemlock, NY (US)

(73) Assignee: Robert Bosch GmbH, Stuttgart (DE)

( * ) Notice: Subject to any disclaimer, the term of this patent is extended or adjusted under 35 U.S.C. 154(b) by 1090 days.

(21) Appl. No.: 12/253,359

(22) Filed: Oct. 17, 2008

(65) Prior Publication Data
US 2010/0097225 A1    Apr. 22, 2010

(51) Int. Cl.
B60R 25/00    (2006.01)
B60R 25/10    (2006.01)
G05B 19/00    (2006.01)
G08B 25/00    (2006.01)
G09F 13/00    (2006.01)

(52) U.S. Cl.
USPC ........... 340/5.7; 340/5.61; 340/5.81; 340/6.1; 340/426.15; 40/444; 40/581

(58) Field of Classification Search ................. 340/5.61
See application file for complete search history.

(56) References Cited

U.S. PATENT DOCUMENTS

| 6,031,465 | A | 2/2000 | Burgess | |
|---|---|---|---|---|
| 6,434,158 | B1 | 8/2002 | Harris et al. | |
| 6,552,649 | B1 * | 4/2003 | Okada et al. | 340/5.61 |
| 6,577,226 | B1 * | 6/2003 | Steiner | 340/5.62 |
| 6,617,975 | B1 | 9/2003 | Burgess | |
| 6,798,336 | B2 | 9/2004 | Kanda et al. | |
| 7,106,171 | B1 | 9/2006 | Burgess | |
| 7,446,644 | B2 | 11/2008 | Schaffzin et al. | |
| 2003/0216817 | A1 * | 11/2003 | Pudney | 700/17 |
| 2005/0110610 | A1 * | 5/2005 | Bazakos et al. | 340/5.82 |
| 2005/0242923 | A1 * | 11/2005 | Pearson et al. | 340/5.62 |
| 2006/0267773 | A1 * | 11/2006 | Roque | 340/572.7 |
| 2007/0035381 | A1 * | 2/2007 | Davis | 340/10.1 |
| 2007/0126561 | A1 | 6/2007 | Breed | |
| 2007/0216764 | A1 | 9/2007 | Kwak | |

FOREIGN PATENT DOCUMENTS

WO    01/23227    4/2001

* cited by examiner

Primary Examiner — Jennifer Mehmood
Assistant Examiner — Pameshanand Mahase
(74) Attorney, Agent, or Firm — Michael Best & Friedrich LLP

(57) ABSTRACT

Methods and systems for an automation and security system including a first sensor, a second sensor, and a controller. The first sensor detects a signal from an identification device indicative of a first authorized person in an exterior area near a door. The second sensor is coupled to a handle on the exterior surface of the door to detect a touch to the handle. The controller is configured to operate one or more lighting devices and a lock associated with the door. When the controller receives a signal from the first sensor indicative of the identification device in the exterior area near the door, it initiates a timer and operates one or more lighting devices to indicate a condition detected by the automation and security system. When the controller receives a signal from the second sensor indicative of a touch to the handle after the initiation of the timer and before the timer expires, it unlocks the door and turns on one or more lights in an interior area.

27 Claims, 7 Drawing Sheets

| Multicolor | Authorized User | Detected Condition |
|---|---|---|
| Red | First Adult | Intruder detected - possibly still present |
| Orange/Yellow | Second Adult | Intruder detected, but no longer present |
| Blue | First Child | Current interior temperature below set point temperature |
| Green | Second Child | Current interior temperature above set point temperature |
| Purple | Third Child | N/A |
| White | None | No detected condition to report |

*FIG. 7a*

Programmed Lighting Setting for First User:
    Blink once for each user detected inside – Thermostat setting - Repeat

| Observed Sequence | Meaning |
|---|---|
| Blue (short), Green (short), Purple (short), White (long) | First, second, and third children are home. Temperature at desired set point. |
| White (short), Blue (long) | No one at home. Temperature is below desired set point. |
| Orange (short), Purple (short), Green (long) | Second adult and third child are home. Temperature is above desired set point. |
| Red (solid) | Intruder detect and possibly still inside home. |

AUTOMATION AND SECURITY SYSTEM

BACKGROUND

Wireless locking systems are becoming common in automotive systems. For example, a key fob (or a key itself) may include a transmitter that sends a signal to a vehicle to unlock one or more of the vehicle's doors. Some such transmitters emit the signal when the user presses a button. However, in some systems, the transmitter automatically communicates with the vehicle whenever the transmitter is within communication range of the vehicle and causes some predetermined action to occur.

SUMMARY

The embodiments of the system described below extend wireless identification and control functionality to home security and automation systems. The system also provides status information to an authorized user who is approaching the exterior of a building. In some embodiments, the status information is presented to the approaching user through a graphical or textual user interface. In other embodiments, the status information is presented as coded output from the home's lighting system. In this latter embodiment, the status information is communicated to the approaching user, but is not readily recognized or understood by others.

In some embodiments, the invention provides a method of operating an automation and security system that includes monitoring a first sensor to detect a signal from an identification device. The signal is indicative of the presence of a first authorized person in an exterior area near a door. In response to a detected signal, a timer is initiated and one or more lighting devices are operated to indicate a condition detected by the automation and security system. A second sensor is then monitored to detect when the first authorized person is touching a handle on the exterior surface of the door. If the second sensor detects a touch on the door knob before the timer expires, the door is unlocked, one or more lights are turned on in an interior area near the door, and the thermostat setting is adjusted. In some embodiments, the method also includes monitoring the first authorized user to detect when the first authorized user is leaving the interior area through the door and, in response, locking the door, turning off one or more interior lights, and adjusting the thermostat setting.

In some embodiments, the method also includes monitoring each identification device within the interior area to track the identity and number of authorized users in the interior area. When an authorized user approaches from the exterior, one or more exterior lighting devices are controlled to indicate the identity or number of authorized users in the interior area. In some embodiments, the method includes detecting an unauthorized person attempting to enter the interior area or present in the interior area. The one or more exterior lighting devices are then used to indicate to an approaching authorized user that the security system has been tripped.

In some embodiments, the method includes entering a "lock-out" mode if the second sensor does not detect a touch on the door knob within a predetermined time after the signal from the identification device is detected. The "lock-out" mode prevents the door from unlocking until a condition is satisfied such as, for example, receiving an access code from the authorized user.

Some embodiments provide an automation and security system that includes a first sensor, a second sensor, and a controller. The first sensor detects a signal from an identification device indicative of the presence of a first authorized person in an exterior area near a door. The second sensor is coupled to the handle on the exterior surface of the door and detects a touch to the handle. The controller is configured to operate one or more lighting devices and a lock associated with the door. When the controller receives a signal from the first sensor, a timer is initiated and one or more lighting devices are operated to indicate a condition detected by the automation and security system. If the controller receives a signal from the second sensor before the timer expires, it unlocks the door, turns on one or more lighting devices in the interior area near the door, and adjusts the thermostat setting. In various embodiments, the one or more lighting devices include interior lighting devices, exterior lighting devices, or a combination of both.

In some embodiments, the controller enters a "lock-out" mode if a signal from the second sensor is not received before the timer expires. When in lock-out mode, in some embodiments, the controller does not unlock the door and exit the lock-out mode until an access code is received from the authorized user.

In some embodiments, each identification device emits a unique signal. Therefore, the controller can determine the number and identify of authorized persons in the interior area. In some embodiments, each identification device includes an RFID (radio frequency identification) device.

BRIEF DESCRIPTION OF DRAWINGS

FIG. 7a is a table showing examples of the lighting color settings of the exterior light and the corresponding condition or authorized user detected by the automation and security system according to an embodiment of the invention.

FIG. 7b is a table showing lighting sequences and the corresponding meanings according to a programmed lighting setting using the condition codes illustrated in FIG. 7a.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
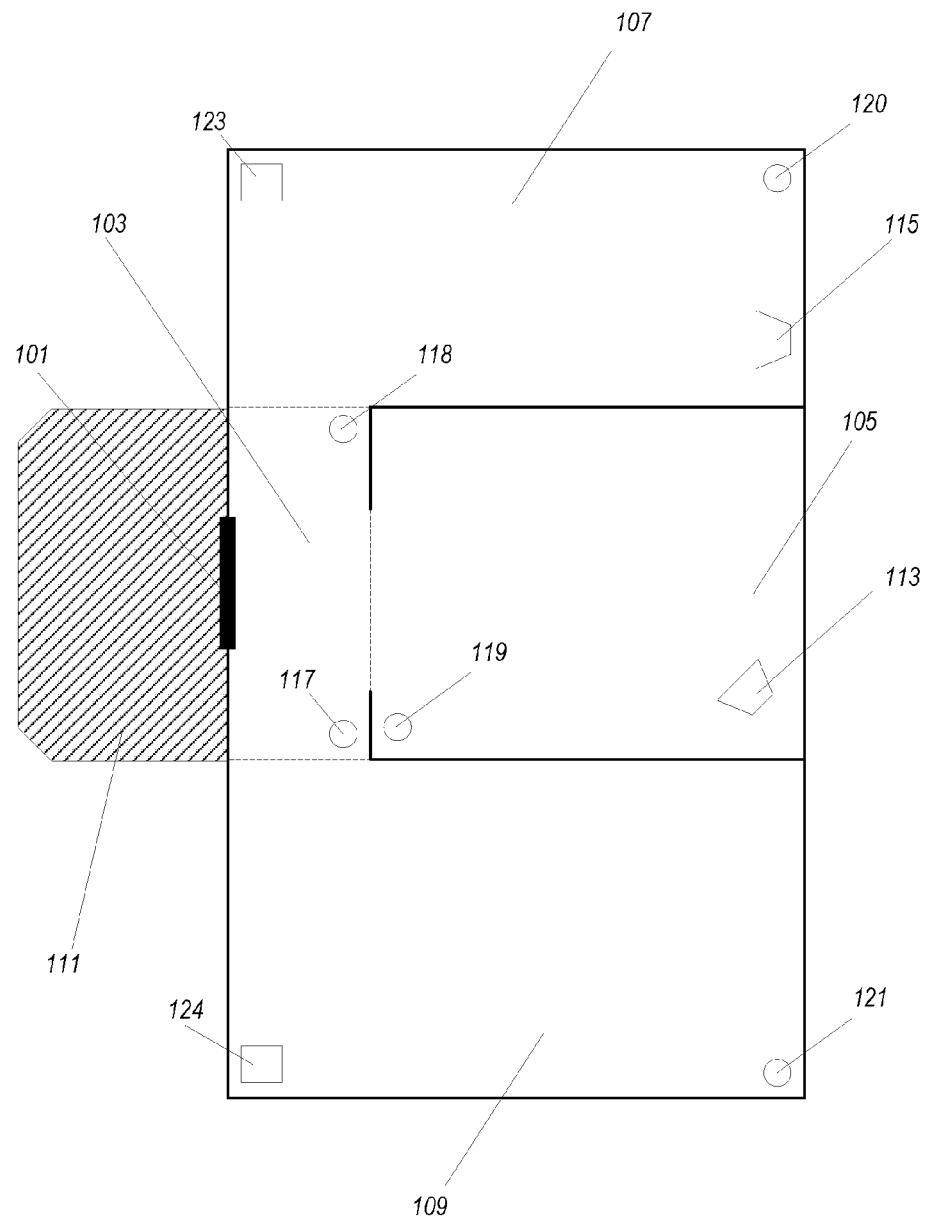
FIG. 1 is a plan view of a home equipped with an automation and security system according to an embodiment of the invention.

FIG. 1 shows an example layout of a portion of a home equipped with the automation and security system according to one embodiment. Front door 101 leads into the entry way 103. The portion of the home shown in FIG. 1 includes three rooms: a first room 105, a second room 107, and a third room 109. At least two sensors are positioned in or near the home to detect an identification device carried by authorized users. The first is positioned to detect identification devices in an exterior area 111 near the front door 101. The second is positioned in the interior to detect authorized users inside the home.

In this example, the identification device is a passive RFID tag. Exterior and interior RFID readers emit a radio frequency (RF) signal. When the passive RFID tag is within range of either RFID reader, the RF signal induces enough current in the passive RFID tag to enable the RFID tag to emit a response that includes a unique user identification number. When the RFID reader detects this response, it is able to detect the presence of an authorized user and determine the identity of that user. The RFID tag can be carried by the user in a variety of ways including in a purse or wallet, incorporated into a vehicle keychain, or surgically implanted beneath the skin. In other embodiments, the identification device can include active or semi-passive RFID tags, magnetic cards, or user-operated devices (similar to standard garage door openers).

In this example, the home includes two televisions 113 and 115 located in the first room 105 and the second room 107, respectively. Several lights are also positioned throughout the home: two lights 117, 118 in the entry way 103, one light 119 in the first room 105, one light 120 in the second room 107, and one light 121 in the third room 109. The home is also equipped with security sensors 123, 124. Although FIG. 1 shows the sensors 123, 124 located in only the second and third rooms 107, 109, in some embodiments, the security sensors are located throughout the home. The security sensors 123, 124 can include, for example, pressure sensors installed on the floor, motion detectors, or window/door sensors.

Figure 2:
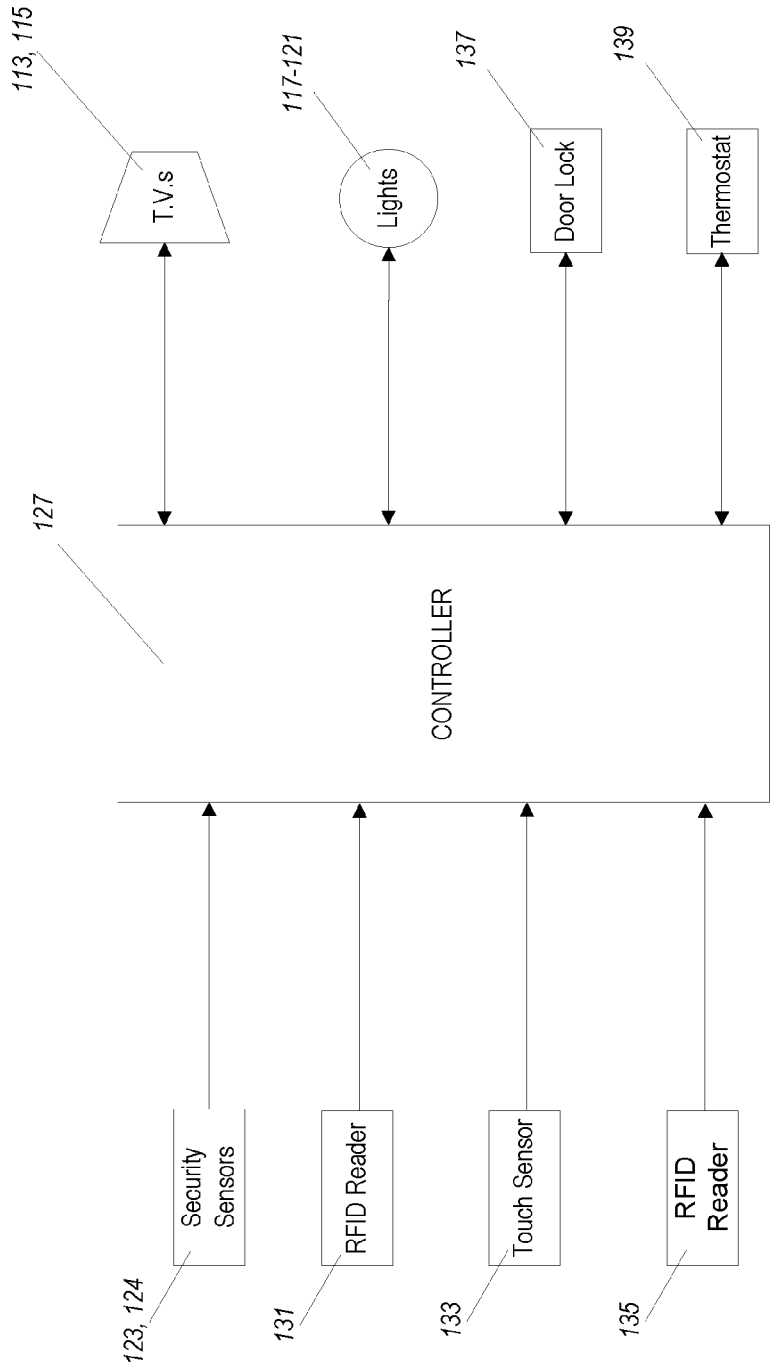
FIG. 2 is a block diagram showing components of the automation and security system.

FIG. 2 illustrates the control system of the automation and security system. Controller 127 monitors several sensors throughout the home including security sensors 123, 124, the exterior RFID reader 131, a door knob touch sensor 133, and the interior RFID reader 135. The controller 127 is also configured to send controlling inputs/commands to operate several electronic devices through the home, including the televisions 113, 115, the interior lights 117-121, an electronically operated door lock 137, and the HVAC thermostat 139. In some embodiments, the controller 127 also receives status information from several of the electronic devices. In this way, the controller 127 is able to determine, for example, whether the television is turned on and what channel, which lights are turned on, and the current temperature of the home. Controller 127 can be embodied in a variety of different ways including a personal desktop computer or a control system installed in the wall of the home and designed specifically for home automation and security.

Figure 3A:
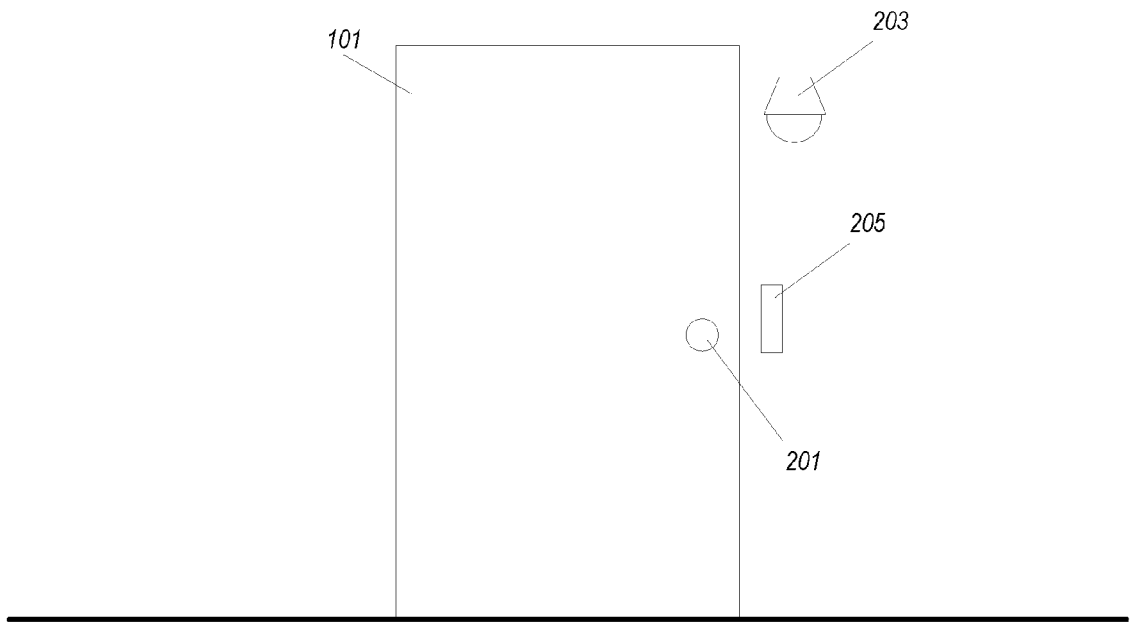
FIG. 3a is an external view of the front door of the home illustrated in FIG. 1.
Figure 3B:
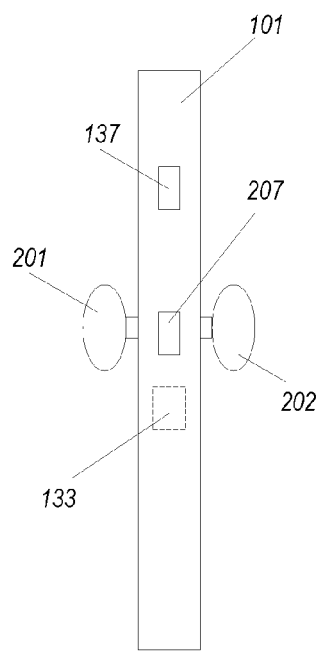
FIG. 3b is a side view of the front door illustrated in FIG. 1 as viewed from the side opposite the hinges.

FIG. 3a shows the front door 101 as viewed from the exterior area 111. As discussed above, the front door 101 includes a handle or door knob 201 that is equipped with a touch sensor 133. Near the front door 101 are an exterior light 203 and an access code input device 205. The access code input device can include, for example, a magnetic card reader, a numeric keypad, or a fingerprint scanner. FIG. 3b shows the side edge of the front door 101 opposite the hinges. The door 101 includes a metal exterior door knob 201, a metal interior door knob 202, and a latching mechanism 207 that is operated by turning either the exterior or interior door knob 201, 202. In this embodiment, the electronically operated door lock 137 includes a deadbolt that engages the door frame to lock the front door 101.

The front door 101 is also equipped with a touch sensor 133 as shown in FIG. 3b. The touch sensor 133 includes a two-channel capacitance sensor. The first channel is coupled to the metal surface of the exterior door knob 201. The second channel is coupled to the metal surface of the interior door knob 202. When a user touches the metal surface of the exterior door knob 201 or the interior door knob 202, the touch sensor 133 detects a change in capacitance through either the first or second channel. When a change in capacitance of either door knob is detected, the two channel touch sensor 133 sends a signal to the controller 127 indicating that a door knob was touched and identifying whether it was the exterior door knob 201 or the interior door knob 202. Although the touch sensor 133 is described in this embodiment as including a two-channel capacitance sensor, other embodiments may include other types of touch sensors such as a single-channel capacitance sensor, a resistance sensor, or a pressure sensor. Furthermore, although FIG. 3b shows touch sensor 133 installed within the front door 101, the circuitry may be installed elsewhere.

Figure 4:
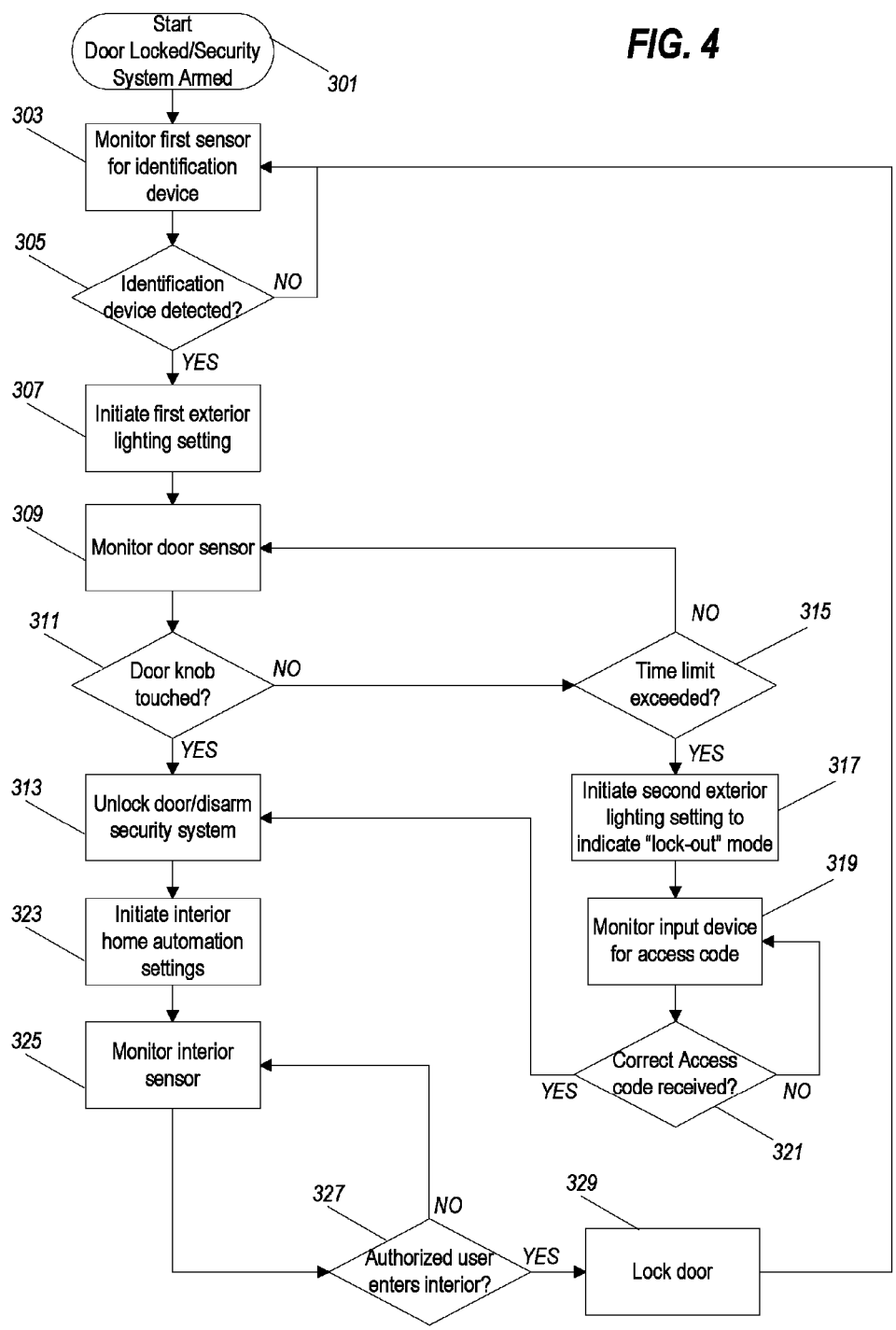
FIG. 4 is a flowchart illustrating the operation of the automation and security system according to an embodiment of the invention when an authorized person is entering a home.

FIG. 4 illustrates the general operation of the automation and security system as installed in the home of FIG. 1. When there are no authorized users in the home, the front door 101 is locked and the security system is armed (step 301). The system monitors the exterior RFID reader 131 for a signal from an identification device (step 303). When an identification device is detected (step 305), the system initiates a first exterior lighting setting (step 307). As discussed in detail below (in reference to FIGS. 5 and 6), the exterior lighting setting can be designed to communicate status information detected by the system.

The system then monitors the door knob touch sensor 133 (step 309) until the authorized user touches the door knob (step 311) or until a time limit is exceeded (step 315). If the user touches the door knob before the time limit expires, the door is unlocked and the security system is disarmed (step 313). The system then initiates an interior home automation setting specific to the identified user (step 323, discussed in detail below in reference to FIG. 8) and monitors the interior RFID reader 135 (step 325) to determine when the user has entered the interior of the home through the front door (step 327, discussed in detail below in reference to FIG. 9). When the user has entered the front door, the system engages the lock (step 329) and returns to monitoring the exterior area 111 for identification devices (step 303).

However, if the user does not touch the door knob before the time limit expires (step 315), the system will enter a lock-out mode. The system initiates a second exterior lighting setting to indicate that the time limit has expired (step 317). While in the lock-out mode, the system will no longer unlock the door in response to a user touching the door knob. Instead, the system monitors the sequence of numeric buttons pressed by the user on the access code input device 205 (step 319). The access code is validated by comparing the received access code to a previously stored access code (step 321). If the received access code and the previously stored access code match, the system exits the lock-out mode, unlocks the door, and disarms the security system (step 313). Although the system in this embodiment will remain in the lock-out mode until a correct access code is received, systems in other embodiments may time-out after a predetermined period and return to step 303.

The system follows similar logic to monitor the entry way 103 for authorized users that are leaving the house through the front door 101. When an identification device is detected in the entry way 103, the system monitors the door knob sensor until a user touches the door knob from the inside or until the identification device leaves the entry way 103. As described above, the system is able to determine the identity of each authorized user in the home. As such, the system is also able to determine when the last person is leaving the home. The system uses this information when operating the automation and security system. For example, although the pressure sensors on the floor or motion sensor will not trigger the alarm when authorized users are present in the home, security sensors on the doors and windows will trigger the alarm. Furthermore, when the system determines that there are no authorized users in the home, the full security system will be armed, including any pressure sensors or motion sensors that are connected to the system. Similarly, when the last authorized user leaves the house, the system locks the door, turns off any lights that are on, and adjusts the thermostat to a lower setting to conserve energy.

Figure 5:
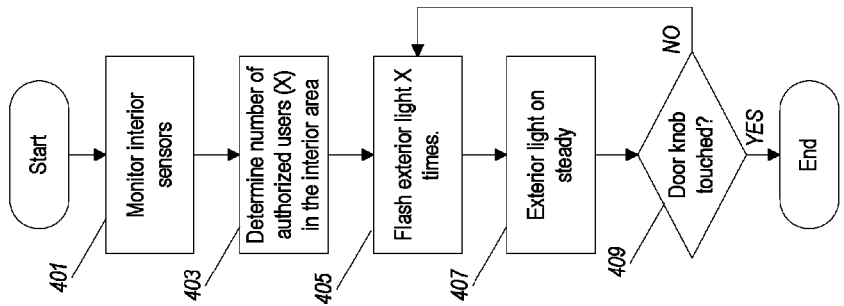
FIG. 5 is a flowchart illustrating one example of indicating a condition detected by the automation and security system to an authorized person approaching a door.

FIG. 5 illustrates a first example of how the exterior light 203 (FIG. 2) is used to communicate a condition detected by the security system. As discussed above, by monitoring the interior RFID readers (step 401), the system is able to determine the number of authorized users in the home (step 403). When an authorized user is detected in the exterior area 111, the exterior light 203 periodically flashes on and off a number of times equal to the number of people inside (step 405). The light is then left on for a slightly longer period of time (step 407). This lighting sequence is repeated until the user touches the door knob (step 409).

In some embodiments, the exterior light is capable of emitting several different lighting colors. For example, a bi-color LED emits light of a first color when current flows in one direction and light of a second color when current flows in the opposite direction. Alternatively, the exterior light could include multiple different light bulbs—each of a different color. The external light could also include a series of colored gel or glass filters that are selectively placed over a single light bulb to change the color of the emitted light. These, and other appropriate multi-colored lighting systems, are known in the art.

Figure 6:
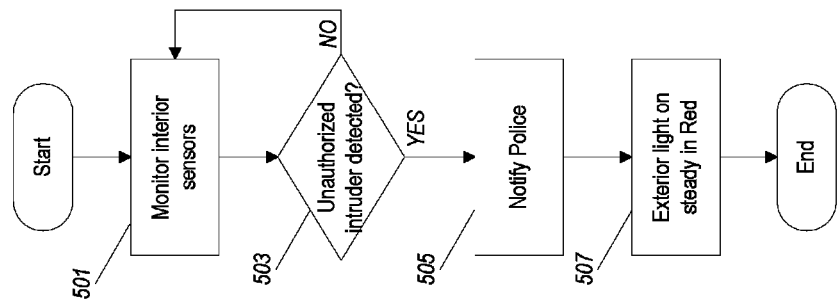
FIG. 6 is a flowchart illustrating another example of indicating a condition detected by the automation and security system to an authorized person approaching the door from the exterior according to an embodiment of the invention.

FIG. 6 illustrates an example of using a multi-colored exterior light 203 to communicate a condition to an authorized user in the exterior area 111. As described above, the system monitors security sensors 123, 124 to detect whether an unauthorized person (e.g., an intruder) has attempted to enter the home or if the intruder is still present in the home (step 501). If an unauthorized person is detected (step 503), the system notifies the police (step 505). If an authorized user is detected in the exterior area 111 while the intruder is still present in the home, the exterior light 203 is turned on and emits a steady red color (step 507).

A multi-colored exterior light 203 may be programmed to communicate status information by displaying different predetermined colors of light, producing flashing or blinking patterns, or a combination of both. FIG. 7a provides examples of a number of conditions that can be indicated to an approaching authorized user and the corresponding exterior light color (FIG. 7a is not intended to provide an exhaustive list of conditions or color outputs). For example, the system can be programmed to display a blue light on the exterior light 203 when the temperature is below his desired target, green when the temperature is above the target, and white when the temperature is at or near the target. Furthermore, because the system is able to determine the identity of the approaching authorized user (when a plurality of users are enrolled in the system), the system can be programmed to provide customized information to each unique user and information regarding the identity of authorized users that are already in the house. Accordingly, the system may be programmed such that red corresponds to the first adult, orange to the second adult, blue to the first child, green to the second child, and purple to the third child.

FIG. 7b provides a series of possible color sequences that might be presented to the first adult as he approaches the front door. In this example, the first adult has programmed the system to communicate the number and identity of authorized users in the home as well as the relative temperature inside the home (as compared to a target set point temperature). According to the settings outlined in FIG. 7a, if the exterior light 203 blinks blue, green, and purple followed by a longer white light, this is interpreted by the approaching first adult as meaning that all three children are home and that the temperature is at or near the desired set point temperature. Similarly, if the exterior light 203 blinks white and is followed by a longer blue light, this is interpreted as meaning that nobody is inside the home and the temperature is colder than the desired set point temperature.

The intended meaning of the lighting colors and the lighting sequences can be customized for each authorized user. However, certain lighting settings may be selected to override the pre-programmed preferences to display urgent messages to an approaching authorized user. For example, as illustrated in FIG. 7b, if an intruder is detected in the home, the exterior light 203 is programmed to emit a solid red color to the approaching authorized user as he approaches the front door regardless of his customized preprogrammed lighting settings.

Figure 8:
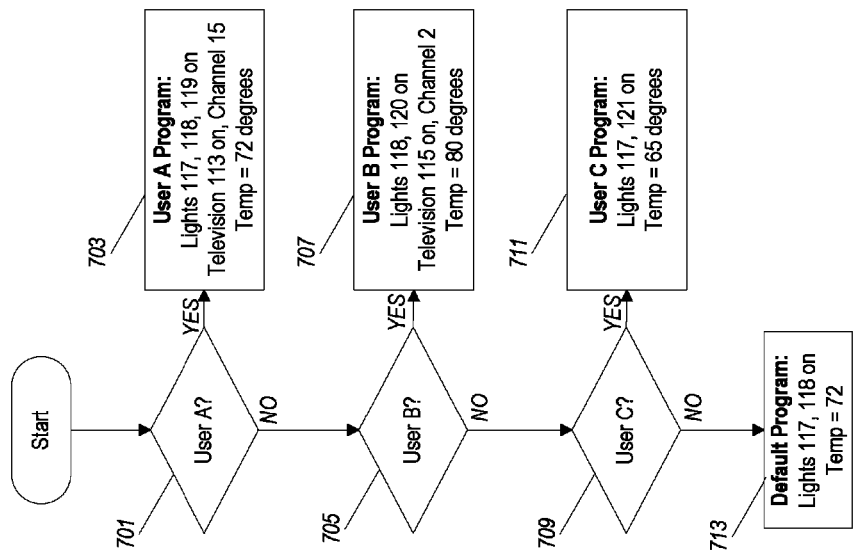
FIG. 8 is a flowchart illustrating certain automated control processes of the automation and security system according to an embodiment of the invention.

Because the system is able to differentiate between authorized users, the system can also be programmed with customizable home automation settings for each user as illustrated in FIG. 8. For example, User A comes home every day just in time to watch the news on channel 15. Therefore, when the system identifies the approaching authorized user as User A (step 701), the system turns on both lights 117,118 in the entry way 103, turns on the light 119 in the first room 105, and turns on the television 113 in the first room 105 to channel 15 (step 703). User B prefers to watch sports programming on channel 2 on the television 115 in the second room 107. Therefore, when the system identifies the approaching authorized user as User B (step 705), the system turns on only one light 118 in the entryway 103, one light 120 in the second room 107, and the television 115 in the second room 107 to channel 2 (step 707). Similarly, if the approaching authorized user is identified as User C (step 709), a third automation program is initiated (step 711). The system can also be programmed to initiate a default program (step 713) for users without a customized automation setting.

In some embodiments, the system programming may be time dependent. For example, the system may be programmed to turn on the television 113 to channel 15 only if User A enters the home between 6:00 PM and 6:30 PM on Monday through Friday. Furthermore, the automation settings may be dependent on the current status of the system and priority settings for each authorized user. For example, if User C comes home to an empty house (e.g., zero authorized users are detected in the interior area), the system turns on the lights 117 and 121 and sets the temperature to 65° F. If User A then enters the building, but has a lower priority setting than User C, the system turns on the lights 118 and 119 (light 117 is already on), turns on the television 113 to channel 15, but does not adjust the temperature setting to 72° F. If, however, User A has a higher priority setting than User C, the temperature setting is changed from 65° F. to 72° F. when User A enters the home.

Although previous examples discuss the automation and security system in terms of having two RFID readers (one exterior and one interior), various embodiments of the system can include more or less. For example, a system with only one RFID reader can be configured to monitor only the exterior area 111, the exterior area 111 and the entry way 103, or the exterior area 111 and the entire interior of the house. Similarly, the system can be configured to monitor more than two sensors. For example, in some embodiments, one RFID reader monitors the exterior area 111, another monitors the entry way 103, a third monitors the first room 105, a fourth monitors the second room 107, and a fifth monitors the third room 109.

When multiple RFID readers are positioned throughout the house, they act as location sensors and the system can be programmed to operate according to the location of a particular user. For example, returning to FIG. 8, when User A enters the entry way 103, the thermostat is adjusted to 72° F. and the lights 117, 118 in the entry way 103 are turned on. The television 113 and the light 119 in the first room 105 are not turned on until User A enters the first room. Similarly, if the HVAC system is configured to regulate the temperature in each room separately, the system adjusts the temperature of each room according to the pre-set preferences of the users that are detected in that room.

Figure 9:
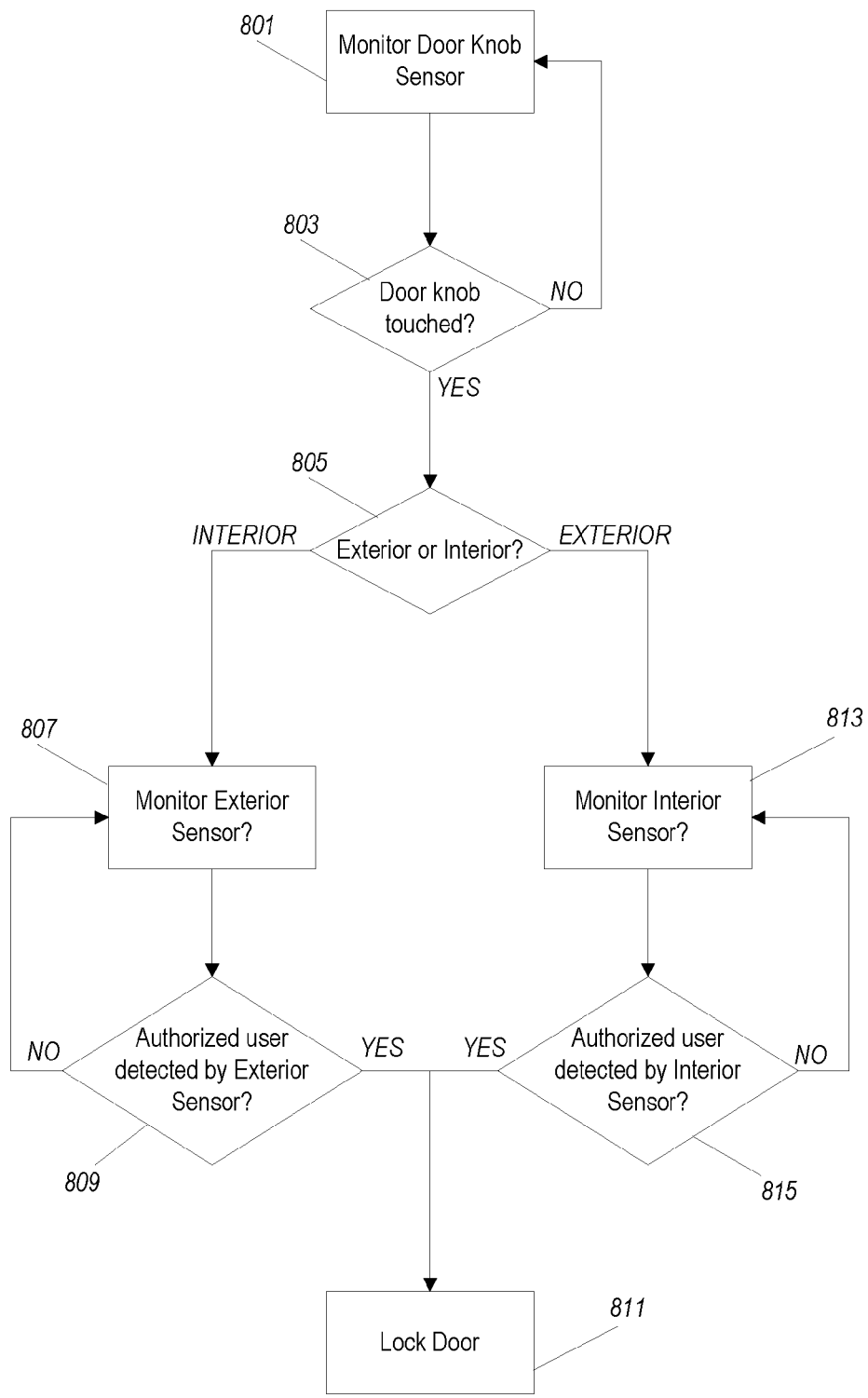
FIG. 9 is a flowchart illustrating how the controller determines when an authorized user is entering or exiting through the door according to an embodiment of the invention.

The use of multiple RFID readers can also assist in determining when an authorized user is leaving through the front door (e.g., moving from the interior area to the exterior area) as illustrated in FIG. 9. The system monitors the door knob sensor (step 801) to determine when a user has touched the door knob (step 803) and whether it was touched from the interior or the exterior (step 805). If the door knob was touched from the interior, the system monitors the exterior sensor (step 807) until the authorized user is detected in the exterior area (step 809). The door is then locked behind the user (step 811). As described above, if the exiting user leaves the house empty (e.g., zero authorized users are detected in the interior area), the security system is armed at step 811.

Similarly, if the system determines that a user is touching the door knob from the exterior, an interior RFID reader is monitored (step 813) until the user is detected in the interior area (step 815). The door is then locked behind the user (step 811). Again, as described in reference to FIG. 4 above, if the user is entering an empty house, the security system is disarmed when the user touches the exterior of the door knob.

Thus, the invention provides, among other things, an automation and security system that detects a signal from an identification device carried by an authorized user and unlocks a door if the door handle is touched before a time limit expires. If the time limit expires before the door handle (or knob) is touched, the system enters a "lock-out" mode and requires an access code before the door is unlocked and the security system is disarmed. However, the constructions and methods described are exemplary. Other configurations and designs are possible. For example, although the above embodiments are described in the setting of a house, the systems and methods of the invention can be applied to other types of buildings and even particular rooms inside a building (e.g., office space in an office building, a retail store in a shopping mall, or an apartment in an apartment building). Furthermore, although the above embodiments communicate status messages to an approaching authorized user using only a single exterior light 203, other embodiments may communicate using a multiple exterior lights, interior lights, a graphical/textual display unit, an audio output, or various combinations of these and other elements. Various features and advantages of the invention are set forth in the following claims.

I claim:

1. A method of operating an automation and security system comprising:
   monitoring a first sensor to detect a signal from an identification device indicative of a first authorized person in an exterior area near a door;
   detecting a condition of an interior area defined by the door;
   in response to the signal detected by the first sensor,
      initiating a timer, and
      operating one or more lighting devices to provide at least one of a predetermined lighting sequence and a predetermined colored light to indicate the detected condition;
   monitoring a second sensor to detect when the first authorized person is touching a handle on an exterior surface of the door; and
   in response to a touch detected by the second sensor before the timer expires,
      unlocking the door, and
      turning on one or more lights in the interior area.

2. The method of claim 1 further comprising
   detecting when the first authorized person moves from the interior area to the exterior area near the door; and
   when the first authorized person moves from the interior area to the exterior area near the door, locking the door, and turning off one or more lights in the interior area.

3. The method of claim 1 further comprising
   monitoring a number of authorized users in the interior area by detecting signals from one or more identification devices,
   wherein each identification device is associated with one of a plurality of authorized users.

4. The method of claim 3 further comprising
   detecting when the number of authorized users in the interior area is zero; and
   when the number of authorized users in the interior area is zero, turning off one or more lights in the interior area, and arming a security system.

5. The method of claim 3, wherein the first authorized person is one of the plurality of authorized users and is attempting to enter the interior area through the door when there are zero authorized users in the interior area.

6. The method of claim 3, wherein operating one or more lighting devices to indicate the condition detected by the automation and security system includes operating one or more lighting devices to indicate the number of authorized users in the interior area.

7. The method of claim 3, wherein operating one or more lighting devices to indicate the condition detected by the automation and security system includes operating one or more lighting devices to indicate an identity of one or more authorized users in the interior area.

8. The method of claim 1, wherein monitoring the first sensor to detect the signal from the identification device indicative of the first authorized person in the exterior area near the door includes monitoring a RFID reader to detect a signal from a radio frequency identification device carried by the first authorized person.

9. The method according to claim 1 further comprising entering a lock-out mode when the timer expires before the second sensor detects the first authorized person touching the handle on the exterior surface of the door.

10. The method according to claim 9 further comprising
receiving an access code from the first authorized person;
validating the access code by comparing the access code to a previously stored access code; and
unlocking the door when the automation and security system is in the lock-out mode if the access code and the previously stored access code match.

11. The method according to claim 10 wherein receiving the access code from the first authorized person includes monitoring a numeric keypad to detect a sequence of buttons pressed by the first authorized person.

12. The method according to claim 1 further comprising
monitoring a third sensor to detect when an unauthorized person is attempting to enter the interior area,
wherein operating one or more lighting devices to indicate the condition detected by the automation and security system includes initiating a first lighting setting when the automation and security system has detected the unauthorized person attempting to enter the interior area.

13. The method according to claim 12, wherein initiating a first lighting setting includes periodically turning a light in the exterior area on and off.

14. The method according to claim 12, wherein initiating a first lighting setting includes turning on a light in the exterior area that emits a predetermined color light.

15. An automation and security system comprising:
a first sensor configured to detect a signal from an identification device indicative of a first authorized person in an exterior area near a door;
a second sensor coupled to a handle on an exterior surface of the door to detect a touch to the handle; and
a controller that detects a condition of an interior area defined by the door, operates one or more lighting devices, operates a lock associated with the door, receives a first signal from the first sensor indicative of the identification device in the exterior area near the door, receives a second signal from the second sensor indicative of the touch to the handle, in response to the first signal from the first sensor, initiates a timer and operates one or more lighting devices to provide at least one of a predetermined lighting sequence and a predetermined colored light to indicate the detected condition, and in response to the second signal from the second sensor after the timer is initiated and before the timer expires, unlocks the door and turns on one or more lights in the interior area.

16. The automation and security system of claim 15, wherein the controller detects when the first authorized person moves from the interior area to the exterior area near the door, and, in response, locks the door and turns off one or more lights in the interior area.

17. The automation and security system of claim 15, further comprising
one or more location sensors configured to detect one or more identification devices, each associated with one of a plurality of authorized users, and
wherein the controller receives the first signal from the one or more location sensors, and determines a number of authorized users located in the interior area based on the first signal received from the one or more location sensors.

18. The automation and security system of claim 17, wherein the controller turns off one or more lights in the interior area when the number of authorized users in the interior area is zero.

19. The automation and security system of claim 17, wherein the first authorized person is one of the plurality of authorized users and is attempting to enter the interior area through the door when there are zero people in the interior area.

20. The automation and security system of claim 17, wherein the controller operates one or more lighting devices to indicate the number of authorized users in the interior area in response to the first signal from the first sensor.

21. The automation and security system of claim 17, wherein the controller operates one or more lighting devices to indicate an identity of one or more authorized users in the interior area in response to the first signal from the first sensor.

22. The automation and security system of claim 15, wherein the first sensor includes a RFID reader configured to detect an RF signal from a radio frequency identification device carried by the first authorized person.

23. The automation and security system of claim 15, wherein the controller enters a lock-out mode when the timer expires before the controller receives the second signal from the second sensor.

24. The automation and security system according to claim 23 further comprising
an access code input device located in the exterior area near the door, and
wherein the controller receives an access code from the access code input device, validates the access code by comparing the access code to a previously stored access code, and unlocks the door when the automation and security system is in the lock-out mode if the access code and the previously stored access code match.

25. The automation and security system according to claim 24, wherein the access code input device includes a numeric keypad.

26. The automation and security system according to claim 15, further comprising
one or more security sensors, and
wherein the controller initiates a first lighting setting in response to the first signal from the first sensor if one or more security sensors indicate that an unauthorized person has attempted to enter the interior area.

27. The automation and security system of claim 26, wherein the controller turns on a light in the exterior area that emits a predetermined color light when the first lighting setting is initiated.

* * * * *